US010718655B2

(12) United States Patent
Pichot et al.

(10) Patent No.: US 10,718,655 B2
(45) Date of Patent: Jul. 21, 2020

(54) METHOD FOR MONITORING A LEVEL METER OPERATING ACCORDING TO THE RADAR PRINCIPLE AND LEVEL METER (71) Applicant: KROHNE S.A.S., Romans-sur-Isere (FR)

(72) Inventors: Vincent Pichot, Romans-sur-Isere (FR); Mahmoud Khodjet Kesba, Romans-sur-Isere (FR)

(73) Assignee: KROHNE S.A.S., Romans-sur-Isere (FR)

( * ) Notice: Subject to any disclaimer, the term of this patent is extended or adjusted under 35 U.S.C. 154(b) by 395 days.

(21) Appl. No.: 15/591,480

(22) Filed: May 10, 2017

(65) Prior Publication Data
US 2017/0328762 A1 Nov. 16, 2017

(30) Foreign Application Priority Data
May 11, 2016 (DE) ......................... 10 2016 108 665

(51) Int. Cl.
*G01F 25/00* (2006.01)
*G01F 23/284* (2006.01)
*G01S 7/288* (2006.01)

(52) U.S. Cl.
CPC ........ *G01F 25/0061* (2013.01); *G01F 23/284* (2013.01); *G01S 2007/2883* (2013.01)

(58) Field of Classification Search
CPC ............... G01F 25/0061; G01F 23/284; G01S 2007/2883
See application file for complete search history.

(56) References Cited

U.S. PATENT DOCUMENTS

| | | | |
|---|---|---|---|
| 5,996,406 A | 12/1999 | Ward | |
| 6,775,533 B2 | 8/2004 | Kakani et al. | |
| 7,965,087 B2 | 6/2011 | Reimelt et al. | |
| 8,069,721 B2 | 12/2011 | Jirskog | |
| 9,035,823 B2 | 5/2015 | Pichot | |
| 9,217,659 B2 | 12/2015 | Janitch | |
| 2012/0268139 A1* | 10/2012 | Fend | G01F 23/24 324/601 |
| 2013/0231877 A1* | 9/2013 | Weber | G01F 23/0061 702/55 |

(Continued)

FOREIGN PATENT DOCUMENTS
DE 298 22 507 U1 2/1999

*Primary Examiner* — Matthew M Barker
(74) *Attorney, Agent, or Firm* — David D. Safran; Roberts Calderon Safran & Cole, P.C.

(57) ABSTRACT

A level meter and a method for monitoring the level meter operating according to the radar principle, in which a signal conductor is lead out of an inner space of a leakage chamber of a bracket housing through a process-side opening of the leakage chamber and/or of the bracket housing into the process-side outer space of the bracket housing. The method involves transmitting a signal in the form of a pulse along the signal conductor, receiving a reflected received signal, relaying the received signal to the control and evaluation unit. In addition to the simple verification of the presence of a leak, a change in the received signal can also be quantified by the frequency spectrum of the received signal being determined and monitoring of the level meter carried out in the frequency domain.

8 Claims, 6 Drawing Sheets (56) References Cited

U.S. PATENT DOCUMENTS

2014/0022112 A1* 1/2014 Pichot ................. G01F 23/0076
                                                              342/124
2016/0266240 A1* 9/2016 Hughes ............... G01F 25/0061
2017/0254891 A1* 9/2017 Malinovskiy ........... G01S 7/023

* cited by examiner

METHOD FOR MONITORING A LEVEL METER OPERATING ACCORDING TO THE RADAR PRINCIPLE AND LEVEL METER

BACKGROUND OF THE INVENTION

Field of the Invention

The invention relates to a method for monitoring a level meter operating according to the radar principle, wherein the level meter has a bracket housing with a leakage chamber arranged on the process side, a signal conductor for conducting transmitted and/or received signals, a transmitting and receiving unit designed for transmitting and receiving the transmitted or, respectively, received signals, and a control and evaluation unit designed for controlling the transmitting and receiving unit and for evaluating the received signals, wherein the signal conductor is lead out of the inner space of the leakage chamber of the bracket housing through a process-side first opening of the leakage chamber and/or of the bracket housing into the process-side outer space of the bracket housing, wherein the process-side first opening of the leakage chamber and/or of the bracket housing and the second opening of the leakage chamber and/or bracket housing facing the transmitting and receiving unit are each sealed with a first seal or with a second seal, comprising the following method steps: transmitting a transmitted signal in the form of a pulse along the signal conductor, receiving a reflected received signal, and relaying the received signal to the control and evaluation unit.

Description of Related Art

Furthermore, the invention relates to a level meter operating according to the radar principle having a bracket housing with a leakage chamber arranged on the process side, a signal conductor for conducting transmitted and/or received signals, a transmitting and receiving unit designed for transmitting and receiving of transmitted or received signals and a control and evaluation unit designed for controlling the transmitting and receiving unit and for evaluating the received signal, wherein the signal conductor is lead out of the inner space of the leakage chamber of the bracket housing through a process-side first opening of the leakage chamber and/or of the bracket housing into the process-side outer space of the bracket housing, wherein the process-side first opening of the leakage chamber and/or of the bracket housing and the second opening of the leakage chamber and/or bracket housing facing the transmitting and receiving unit are each sealed with a first seal or with a second seal.

In industrial measurement technology, radar fill meters are often used for determining the fill level of media such as liquids, bulk materials or slurries within containers such as tanks or silos. The physical principle carried out by the measuring device is the running time method. In detail, an electromagnetic signal in the form of a pulse is transmitted along the signal conductor, which is reflected on the fill material surface and then registered by the receiving unit. The distance to the fill material surface can be determined from the transit time of the reflected received signal and, at a known distance to the floor of the container, the fill level of the container is determined. The transmitted and received signals are mostly microwave radiation.

Dielectric resonators are often used as signal conductors. These have a resonance behavior similar to waveguides, however, since they do not have metallic walls, they are able to emit electromagnetic energy and, thus, can function as antennae.

Normally, measuring devices are sealed against the fill material whose fill level is to be determined. Additionally, a leakage chamber can be provided that is sealed both on the process side as well as on the side facing away from the fill material. In particular, in the case of aggressive, polluting or potentially explosive fill material or if there are high pressures and temperatures in the processes, such a leakage chamber is advantageous for monitoring the state of the process-side seal.

The invention relates, in particular, to a method for monitoring the leak tightness of a seal arranged between the container and the bracket housing and/or the leakage chamber.

U.S. Pat. No. 9,217,659 B2 discloses a method for monitoring a level meter operating according to the radar principle, wherein the level meter has a bracket housing with a leakage chamber arranged on the process side and wherein the leakage chamber has a seal on the process-side as well as on the side opposite the fill material. The monitoring of the seal arranged on the process side is carried out by measuring the echo signal guided over the signal conductor. If a seal is not working, the medium held in the container can thus enter the leakage chamber. As a consequence of the impedance change within the leakage chamber resulting therefrom, the transmitted signal is reflected as early as entrance in the leakage chamber. Thus, a leak in the seal to the container can be verified in that the received signal has an additional reflection signal in the form of a pulse, which is to be assigned locally to the leakage chamber due to its transit time.

A method for monitoring a state of a level meter operating according to a radar principle is known from German Patent Application DE 10 2012 014 267 A1 and corresponding U.S. Pat. No. 9,035,823 B2, in which the transmission characteristic of the antenna is determined and the result of the evaluation is compared to a comparison value. Thereby, a leak in the seal between the measuring device and the container is registered by a change in the transmission characteristic of the antenna.

A method for detecting a leak in the seal between the measuring device and the container holding the medium based on time domain reflectometry is also known from German Patent Application DE 10 2006 019 191 A1 and corresponding U.S. Pat. No. 7,965,087 B2.

According to the noted prior art, the verification of a leak occurs solely based on time. A further evaluation, in particular a quantification of the change in the received signal that could be informative about the intruding medium, however, does not take place.

SUMMARY OF THE INVENTION

Based on this prior art, a primary object of the present invention is to provide a method for monitoring a level meter operating according to the radar principle as well as to provide a corresponding level meter, with which, in addition to the simple verification of the presence of a leak, also the change in the received signal can be quantified.

In the following implementations, two different states of the level meter are referred to for explaining the method according to the invention. Thereby, "defect-free" is used to describe the state in which all seals in a transition area between the container and the bracket housing or leakage chamber are in working order and medium is not able to enter the leakage chamber from the container. This is to be distinguished from the state "defective", in which there is leakage. This describes the state, in which the seal between the container and the bracket housing or the leakage chamber is defective, so that at least a portion of the medium is able to enter the leakage chamber from the container.

The above-described object is achieved according to a first teaching of the present invention with a method described in the introduction in that the frequency spectrum of the received signal is determined and the monitoring takes place in the frequency domain.

It has been identified according to the invention that the intrusion of a medium into the leakage chamber not only causes an additional reflection in the received signal, but also affects the frequency spectrum contained in the received signal. In detail, a frequency shift of the frequencies contained in the received signal in the defect-free state at least partially takes place. Furthermore, the received signal contains further frequencies in the case of an existing leak, i.e., in the "defective" state, and thus also differs from the spectrum in the defect-free state. Thereby, the verification of a leak using the change in the frequency spectrum of the received signal has the advantage that changes in the received signal can be described using tangible parameters such as, for example, the size of the frequency and/or the amplitude of the signal in the frequency domain, so that a change in the received signal is not only easily identified, but also can be easily quantified.

Thereby, the media having different permittivities, entering into the leakage chamber can be differentiated from one another based on their varying attenuation of the transmitted and received signal using the amplitudes of the signals in the frequency spectrum. Insofar, using the method according to the invention, not only the pure verification of a leak takes place, but also statements can be made about the type and/or the characteristics of the intruding medium.

According to a first, advantageous implementation, the frequency spectrum of the range of the received signal is determined, which is to be assigned to the leakage chamber due to its transit time. According to this implementation, the range of the received signal is exactly evaluated, in that a change based on leakage is to be expected. First, it can be thereby ruled out that changes in the observed frequency spectrum are based on changes of the fill level in the container. Second, changes in the frequency spectrum are particularly distinct and easy to verify, since the range of the received signal to be examined does not contain frequency portions that are based on reflections not relevant to the present method. The background signal can thus be reduced to a minimum. Reflections that are not relevant to the method according to the invention are, for example, the reflections of the transmitted signal on the fill material surface or the reflections on the floor of the container.

According to a further preferred implementation, at least one monitoring parameter for monitoring the level meter is extracted from the frequency spectrum of the received signal. It is particularly advantageous when, in particular during a running measurement, the verification of a leak can take place by changing the monitoring parameter. According to this implementation, the verification of a leak can take place particularly quickly and reliably.

Monitoring parameters are preferably the value of individual frequencies and/or the amplitude of signals in the frequency domain and/or further parameters that are indirectly derived from the frequency spectrum and that change when a medium enters the leakage chamber.

Such a parameter is, for example, the resonance frequency of the resonator formed by the leakage chamber. If a medium other than air enters the leakage chamber, which is filled, for example, with dry air, then the propagation velocity of the transmitted signal moving along the signal conductor changes. Subsequently, the resonance frequency of the resonator formed by the leakage chamber is changed. This can be determined from the measured frequency spectrum if the length of the resonator is known. Insofar, a change of the resonance frequency is an indicator for a leak of the seal of interest.

Additionally or alternatively, a monitoring parameter can be determined in that a plurality of measured values, whose size is dependent on the medium in the leakage chamber, is combined and that at least one parameter is determined, which changes in dependence on one or more of these measured values.

It is particularly preferred that the measured frequencies and/or the amplitudes of the signals in the frequency domain are combined in one matrix and a parameter is determined, which changes in dependence on the individual values of the matrix. This implementation has the advantage that a plurality of individual frequencies and/or amplitudes can be simultaneously monitored, wherein a change in individual frequencies and/or amplitudes is registered as verification of a leak.

For example, in the case of a square matrix, such a parameter can be the determinant of the matrix. This is solely dependent on the individual elements of the matrix and changes, provided a value of the matrix changes. Additionally or alternatively, one or several singular values of the matrix for any dimensions of the matrix can be a parameter for monitoring the state of the level meter. These are clearly identified by the values of matrix. A change in individual values results in at least a partial change of the singular value, so that this parameter is also suitable as monitoring parameter for the state of the level meter. Due to this implementation of the method according the invention, in particular media having only slightly different permittivities entering the leakage chamber can be differentiated. Insofar, this method is very sensitive and thus particularly suited for verifying leaks.

In order to keep the amount of calculating low, the size or the dimension of the matrix formed of the measured values is adapted so that an adequate solution can be guaranteed.

In order to extract a monitoring parameter from a matrix, for example, the matrix pencil algorithm can be used.

According to a further advantageous implementation, the determination of the frequency spectrum is carried out using a Fourier transformation of the received signal. With the help of the Fourier transformation, temporally continual, non-periodic signals in the frequency domain can be represented by a breakdown into individual frequency portions. Insofar, it is possible to assign a well-defined plurality of frequencies and/or amplitudes of the signals in the frequency domain to a reflected received signal. In this manner, a change of the received signal is particularly easy to validate and to quantify.

It is also particularly preferred when the evaluation unit has a plurality of stored matrices for different media having different permittivities and when the matrix generated from the measured frequencies and/or amplitudes is compared to the stored matrices. This has the advantage that the type and/or the characteristics of the medium in the leakage chamber can be indicated in the measured received signal.

It is particularly advantageous, thereby, when the pulse length of the transmitted signal is varied when determining or recording reference matrices and/or during a running measurement, so that the degree of complexity of each matrix can be adapted.

In order to minimize the calculating effort, the matrix for determining the medium entering the leakage chamber is compared to the reference matrices stored in the evaluation unit, preferably only in the case of a leakage.

According to a further teaching of the present invention, the object described in the introduction is achieved by the level meter operating according to the so-called radar principle in that it has an evaluation unit, which is designed so that the frequency spectrum of the received signal is determined and that the monitoring of the level meter is carried out in the frequency domain.

Preferably, the evaluation unit is designed for carrying out one of the above-described methods.

In detail, there is a plurality of possibilities for designing the method according to the invention for monitoring a level meter operating according to a radar principle and the level meter according to the invention as will be apparent from the following description of the preferred embodiments in conjunction with the accompanying drawings.

DETAILED DESCRIPTION OF THE INVENTION

Figure 1:
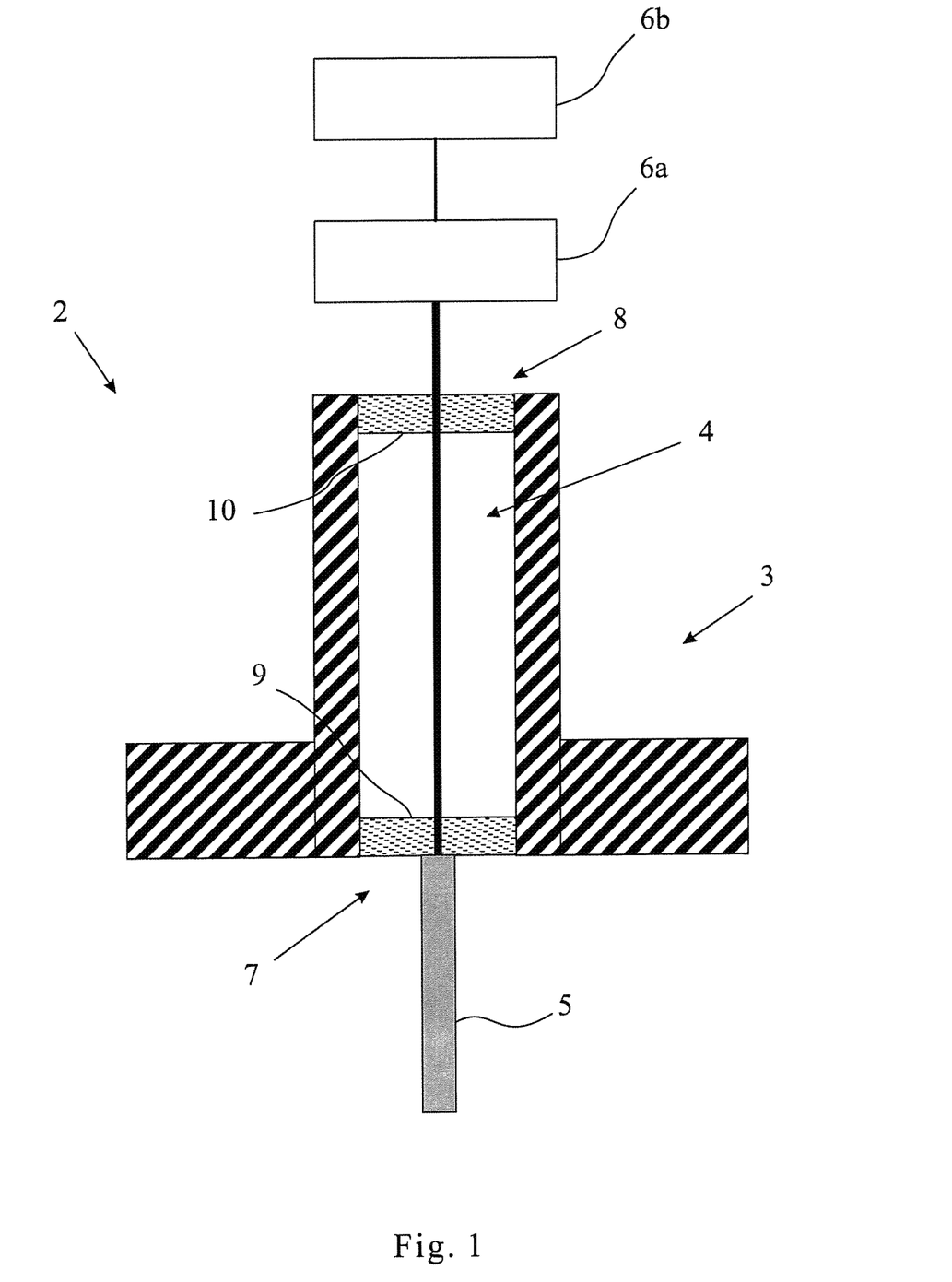
FIG. 1 schematically shows a first embodiment of a device according to the invention.

A first embodiment of a level meter 2 according to the invention, which is suitable for carrying out a method 1 according to the invention, is represented in FIG. 1. The level meter 2 operates according to the radar principle. It is comprised of a bracket housing 3 with a leakage chamber 4 arranged on the process side, a signal conductor 5 for conducting transmitted and/or received signals of a transmitting and receiving unit 6a designed for transmitting and receiving the transmitted or, respectively, received signals, and a control and evaluation unit 6b designed for controlling the transmitting and receiving unit 6a and for evaluating the received signals. In the illustrated level meter 2, the signal conductor 5 is lead out of the inner space of the leakage chamber 4 of the bracket housing 3 through a process-side first opening 7 of the leakage chamber 4 and of the bracket housing 3 into the process-side outer space of the bracket housing 3. Additionally, the process-side first opening 7 of the leakage chamber 4 and of the bracket housing 3 and the second opening 8 of the leakage chamber 4 facing the transmitting and receiving unit 6a are each sealed with a first seal 9 or with a second seal 10, the medium held in the container is thereby prevented from reaching the environment. This is particularly relevant when the medium held in the container is harmful to the environment or when there is a high pressure in the container.

Due to the presence of the leakage chamber 4, the leak tightness of the process-side first seal 9 is tested by the method 1 according to the invention. For this, the control and evaluation unit 6b in the shown embodiment is designed so that it is suitable for carrying out the method 1 according to the invention for monitoring a level meter 2. In the shown embodiment, the leakage chamber 4 is filled with dry air. If the first, process-side seal 9 is leaky, then the medium enters into the leakage chamber 4 from the container (not shown). This state can be quickly and reliably verified by the method 1 according to the invention.

Figure 2:
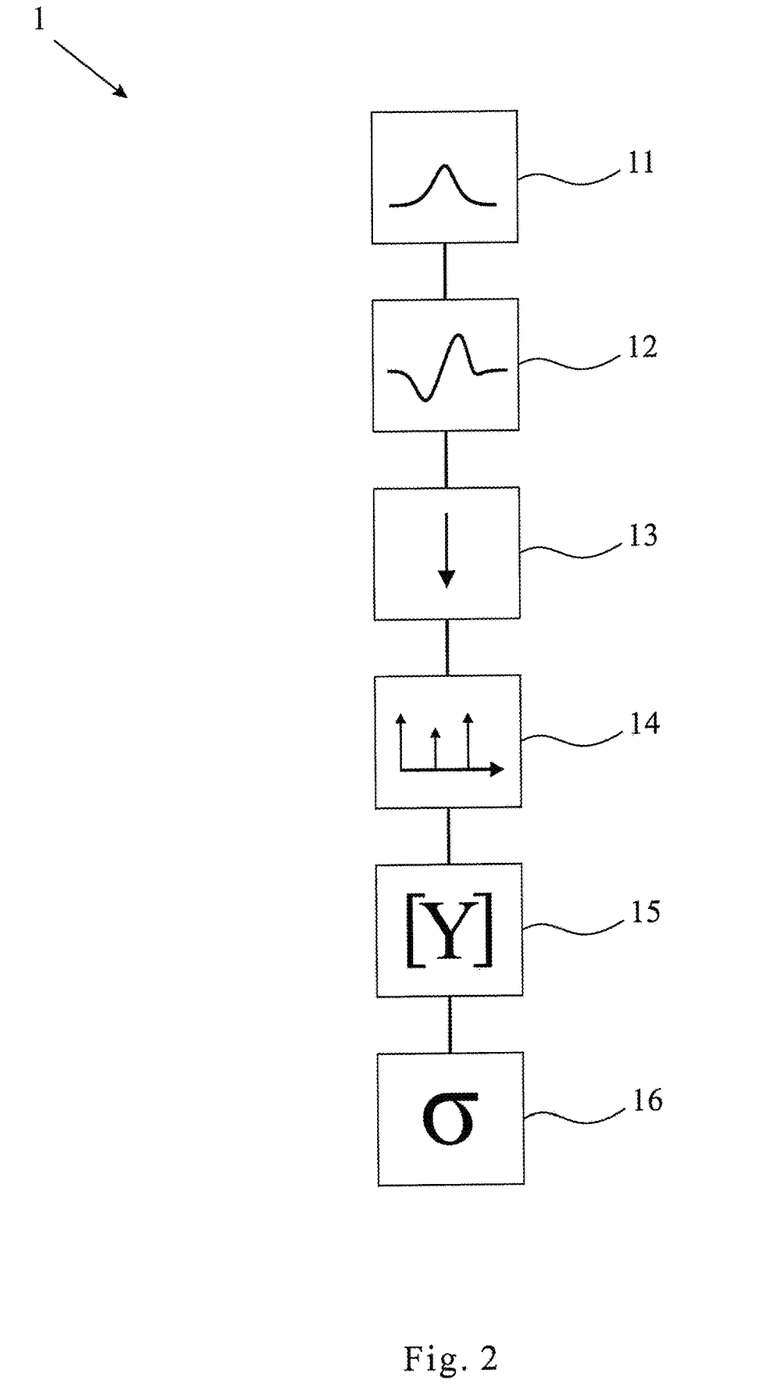
FIG. 2 is a flow chart of a first embodiment of a method according to the invention, FIG. 3 a second embodiment of a device according to the invention and graphs representing a method according to the invention.

A first embodiment of a method 1 according to the invention for monitoring a level meter 2 is shown in FIG. 2, wherein the level meter 2 is designed according to the embodiment shown in FIG. 1. In a first step 11, an electromagnetic signal in the form of a pulse, presently a radar signal, is transmitted along the signal conductor 5 in the direction of the medium to be measured. This signal in the form of a pulse is reflected on impedance jumps, such as the transition in the process-side container not shown in FIG. 1 or is reflected on the surface of the medium to be measured in the container. In a second step 12, the reflected received signal is received by the transmitting and receiving unit 6a and relayed 13 to the control and evaluation unit 6b for further evaluation. In the control and evaluation unit 6b, the frequency spectrum of the received signal is determined 14 by means of a Fourier transformation.

This frequency spectrum that can be assigned to a received signal is the basis for the monitoring of the level meter 2, in particular for the verification of the seal-tightness of the first, process-side seal 9. Thereby, the presence of a leak is detected by a change in the measured frequency spectrum. Using the method 1 according to the invention, it is possible to quickly and reliably detect a leak in an advantageous manner. Furthermore, it is also possible, based on the verification of a change in the frequency spectrum, to quantify this change using precise parameters and thus to make further statements about the medium that has entered into the leakage chamber 4.

In order to improve the detection of changes in the frequency spectrum, the frequency spectrum of the range of the received signal is determined in the shown embodiment of the method 1 according to the invention, which is to be assigned to the leakage chamber 4 due to its transit time. Insofar, changes that are not relevant, such as changes in the fill level of the container, are not taken into account for the evaluation of the verification of a leak.

In order to provide a simple and quick detection of a leak, a monitoring parameter is determined in a next step 15 from the frequency spectrum, whose change correlates with a leak.

Presently, the measured frequencies and the amplitudes of the signals in the frequency domain are combined in a matrix for this, so that an image of the received signal exists. From this matrix, the singular values of the matrix clearly assignable to the matrix are determined with the help of singular value decomposition 16. These signal values change in dependence on the individual values of the matrix and, insofar, in dependence on the change of the frequency spectrum. The seal-tightness of the first, process-side seal 9 can be continually monitored using the continuous determination of one or several singular values of the measured frequency spectrum.

Additionally, in the illustrated method, the control and evaluation unit 6b has reference matrices based on frequency spectrums that were recorded or simulated with different media. By comparing the matrix created in step 15 with the reference matrices, not only is a leak verified, but the medium entering into the leakage chamber 4 can also be determined.

Insofar, the method according to the invention ensures, first, a quick and reliable verification of a leak in the seal to be monitored, and also the medium entering into the leakage chamber can be determined with a comparison to previously stored matrices.

Figure 3:
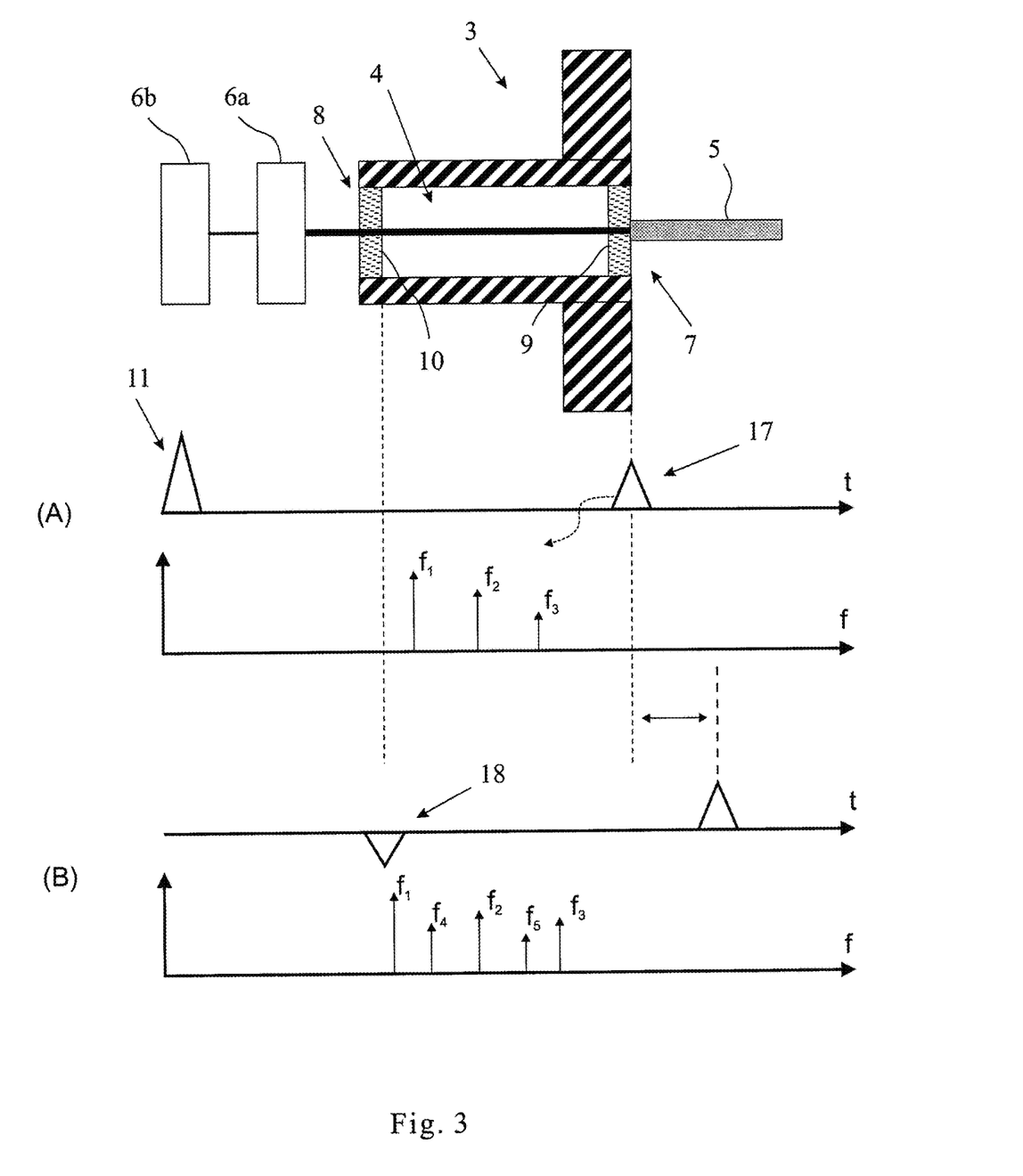

FIG. 3 shows a second embodiment of a level meter 2 according to the invention and a method 1 according to the invention for monitoring the level meter 2. The embodiment shown in FIG. 3 of a level meter 2 according to the invention has a bracket housing 3 with a leakage chamber 4 arranged on the process side, a signal conductor 5 for conducting transmitted and/or received signals of a transmitting and receiving unit 6a designed for transmitting and receiving of transmitted or received signals and a control and evaluation unit 6b designed for controlling the transmitting and receiving unit and for evaluating the received signal. The signal conductor 5 in the shown level meter 2 is lead out of the inner space of the leakage chamber 4 of the bracket housing 3 through a process-side first opening 7 of the leakage chamber 4 and of the bracket housing 3 into the process-side outer space of the bracket housing 3. Additionally, the process-side first opening 7 of the leakage chamber and of the bracket housing 3 and the second opening 8 of the leakage chamber facing the transmitting and receiving unit 6a are each sealed with a first seal 9 or with a second seal 10.

In this embodiment, the impedances of the inner space of the leakage chamber 4, of the seals 9 and 10 and of the signal conductor 5 are the same size.

The control and evaluation unit 6b is designed so that it is suitable for carrying out the method 1 according to the invention.

The graphs illustrated below the level meter 2 show a second embodiment of a method 1 according to the invention. An embodiment of a defect-free state is represented by (A). The upper graph shows the transmission 11 of a signal in the form of a pulse as well as the reflection 17 of this signal on the impedance transition after the process-side first seal 9. The lower graph shows the discrete frequency spectrum determined from this reflection, which is composed of the frequencies f1, f2 and f3.

In comparison to (A), the situation of a leak of the first seal 9 is represented by (B). Due to the medium having leaked in to the leakage chamber 4, a reflection 18 of the transmitted signal in the form of a pulse has already taken place because of the impedance transition after the second seal 10. Additionally, the second reflection 17 occurs shifted in time because of the lower propagation velocity of the transmitted signal in the medium that has entered into the leakage chamber 4. The lower graph shows the frequency spectrum that can be assigned to the received signal. In comparison to the frequency spectrum of the defect-free state shown by (A), a frequency shift of the frequencies f1 to f3 takes place, wherein differences in the amplitudes of the frequencies in the frequency domain also exist. Furthermore, the frequency spectrum shown by (B) has additional frequencies f4 and f5.

Figure 4:
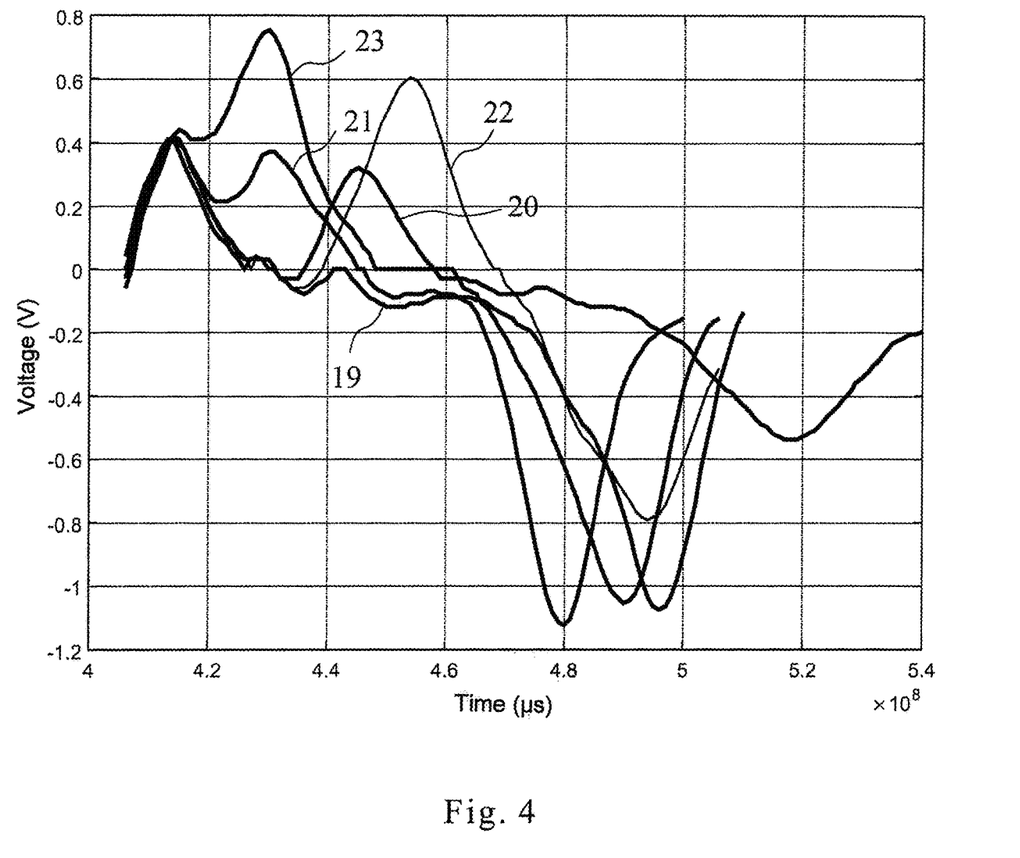
FIG. 4 is a graph representing a first measurement of the received signal both for the defect-free state as well as for the case of a leak, wherein two different media enter into the leakage chamber.

FIG. 4 shows a first measurement of the received signal for both the defect-free state as well as in the case that the seal between the container and the bracket housing or the leakage chamber has a leak. Thereby, the exact range of the received signal is illustrated, which is to be assigned to the leakage chamber. The measurement shows, first, a first received signal 19 of the defect-free state. Because of the reflection of the signal when entering and exiting the leakage chamber, this first received signal 19 has two pulses. In comparison to this state, a second received signal 20 of a state is illustrated, in which a first oil having a permittivity of 2, 3 has entered partially into the leakage chamber. In addition to the pulses based on entering and exiting the leakage chamber, the course of the second received signal 20 has an additional pulse, which is based on the reflection of the transmitted signal at the transition to the first oil. Additionally, a third received signal 21 is illustrated, which is based on the state, in which the first oil has almost completely entered the leakage chamber. The additional reflection, thus, occurs earlier in time compared to the second received signal 20. Finally, a fourth received signal 22 shows the state, in which a second oil having a permittivity of 5, 7 has partially entered into the leakage chamber. The course of this received signal 22 also has an additional pulse in addition to the reflections from entering and exiting the leakage chamber, this pulse being based on the reflection of the transmitted signal on the second oil. A further, fifth received signal 23 shows the state, in which the second oil has almost completely entered into the leakage chamber. In comparison to the course of the fourth received signal 22, the additional pulse occurs, insofar, earlier in time.

The illustrated measurement shows, as is known from the prior art, that the entering of a medium into the leakage chamber can be verified by the course of the received signal.

Figure 5:
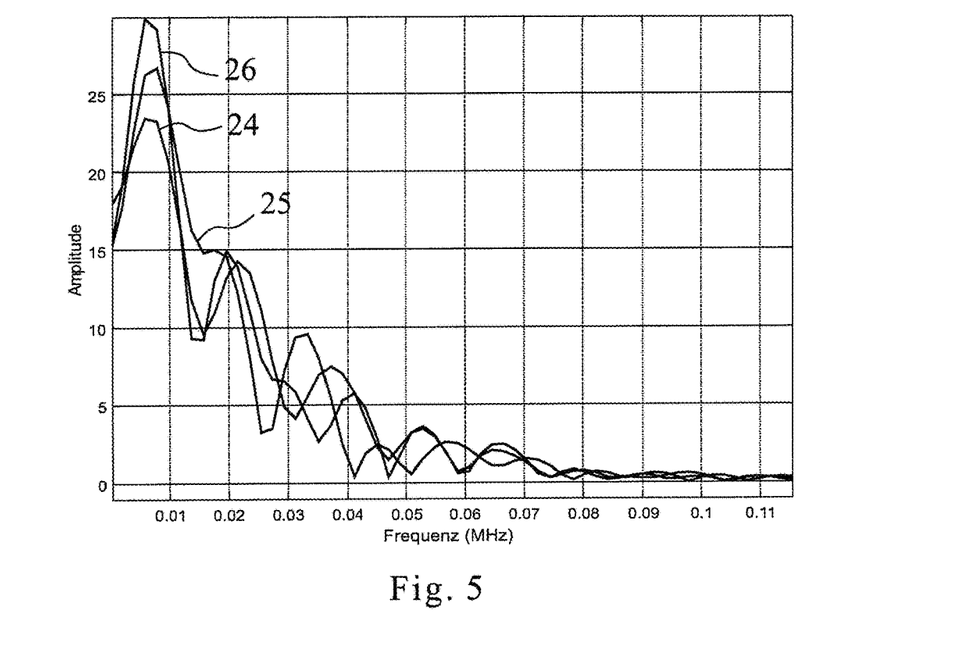
FIG. 5 is a graph representing the defect-free state in comparison to the entering of the first medium in the frequency domain.
Figure 6:
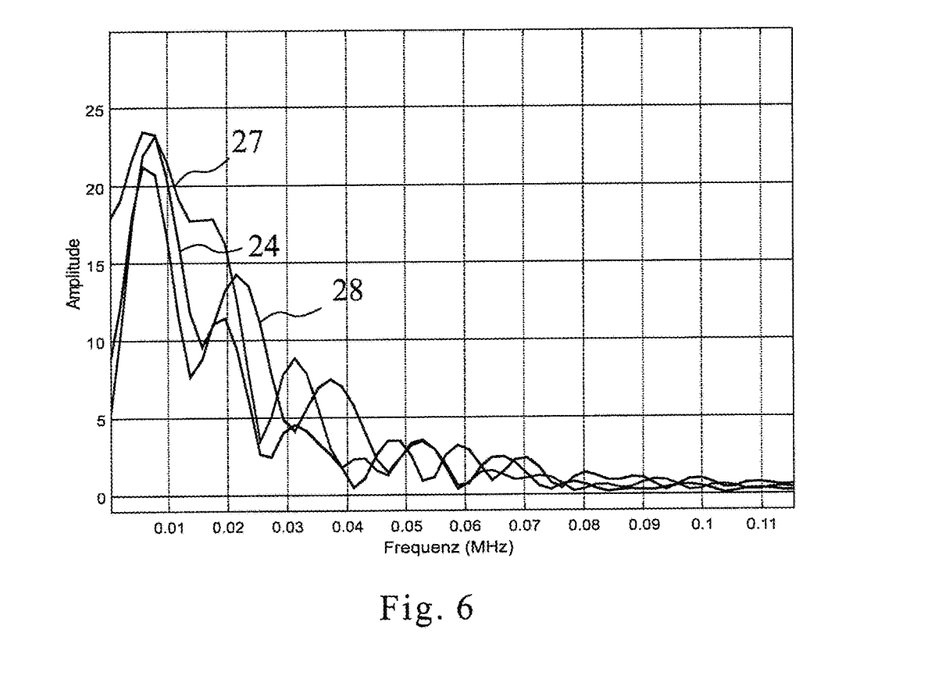
FIG. 6 is a graph representing the defect-free state in comparison to the entering of the second medium n the frequency domain.

The frequency decomposition of the received signals shown in FIG. 4 is illustrated in FIGS. 5 and 6. In detail, FIG. 5 shows a first frequency spectrum 24 based on the first received signal 19 in the defect-free state. Additionally, FIG. 5 shows a second frequency spectrum 25 based on the received signal, in which the first oil has partially entered into the leakage chamber and a third frequency spectrum 26 of the received signal, in which the first oil has almost completely entered into the leakage chamber. The comparison shows that the frequency spectrums differ both in the position of individual frequencies as well as in their amplitudes.

Figure 7:
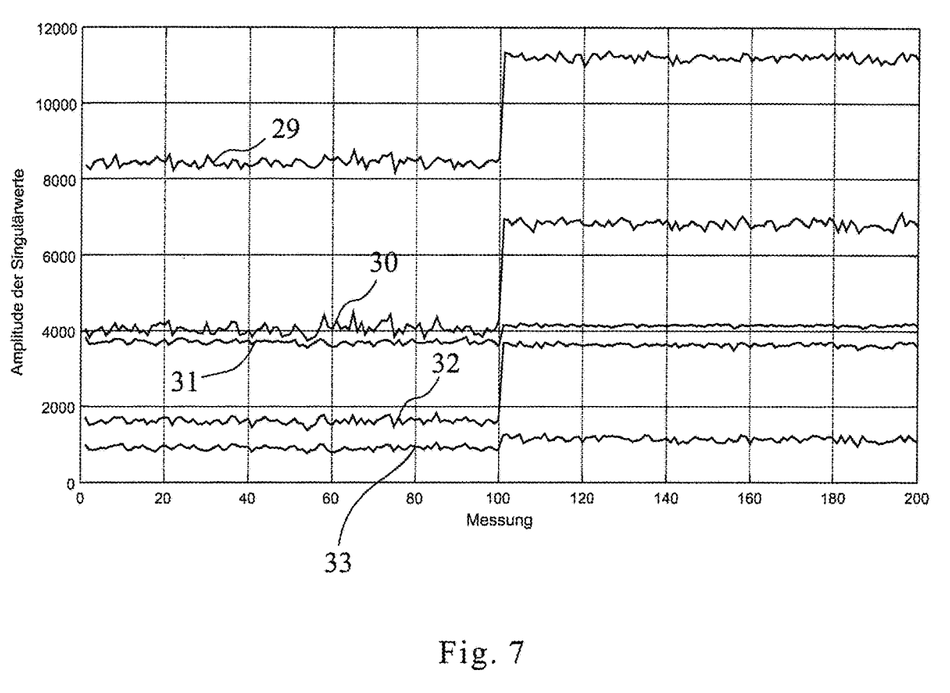
FIG. 7 is a graph representing a second measurement of the singular values of a matrix of measured frequencies.

FIG. 6 shows a first frequency spectrum 24 based on the first received signal 19 in the defect-free state. Additionally, FIG. 6 shows a second frequency spectrum 27 that is based on the received signal, in which the second oil has partially entered into the leakage chamber and a third frequency spectrum 28 of the received signal, in which the second oil has almost completely entered into the leakage chamber. The comparison also shows that the frequency spectrums differ both in the position of individual frequencies as well as in their amplitudes FIG. 7 shows the suitability of the singular values of a matrix of measured values for the verification of a leak. The illustrated measurement first shows the course individual singular values 29 to 33 for the defect-free state. Starting at a measured value 100, the measurement shows a state, in which the leakage chamber has been filled with the second oil. This results in a change of each individual singular value in the shown example. Insofar, the measurement shows the basic suitability of the singular values of the matrix as monitoring parameter and, in particular, for the verification of a leak.

What is claimed is:

1. A method for monitoring a level meter operating according to the radar principle, wherein the level meter has a bracket housing with a leakage chamber arranged on a process side, a signal conductor for conducting at least one of transmitted or received signals, a transmitting and receiving unit designed for transmitting and receiving the transmitted or, respectively, received signals, and a control and evaluation unit for controlling the transmitting and receiving unit and for evaluating the received signals, wherein the signal conductor is lead out of the inner space of the leakage chamber of the bracket housing through a process-side first opening conducting at least one of the leakage chamber or of the bracket housing into the process-side outer space of the bracket housing, wherein the process-side first opening of at least one of the leakage chamber or of the bracket housing and a second opening of at least one of the leakage chamber or bracket housing facing the transmitting and receiving unit are each sealed with a first seal or with a second seal, the method comprising the following steps:

transmitting a transmitted signal in the form of a pulse along the signal conductor, receiving a reflected received signal, relaying the received signal to the control and evaluation unit, determining a frequency spectrum of the received signal, and carrying out monitoring of the level meter in the frequency domain, extracting at least one monitoring parameter for monitoring the level meter from the frequency spectrum of the received signal, detecting a leakage as a change in the monitoring parameter wherein the determining of the frequency spectrum comprises determining of a range of the received signal and assigning the frequency spectrum to the leakage chamber due to its transit time.

2. The method according to claim 1, wherein said extracting step comprises extracting the monitoring parameter as a value of at least one of individual frequencies or amplitudes of the signals received.

3. The method according to claim 1, wherein said at least one monitoring parameter extracted additionally comprises resonance frequencies of the signal conductor.

4. The method according to claim 1, wherein additionally, the monitoring parameters extracted are at least one of individual frequencies or amplitudes of a frequency spectrum that are combined, and wherein at least one parameter is determined that changes in dependence on the change of one or several of at least one of these frequencies or amplitudes.

5. The method according to claim 4, wherein at least one of the measured frequencies or the amplitudes of the signals in the frequency domain are combined in a matrix and that one or more singular values of the matrix is/are monitoring parameter(s).

6. The method according to claim 1, wherein the frequency spectrum is determined using a Fourier transformation of the received signal.

7. The method according to claim 1, wherein the control and evaluation unit has a plurality of at least one of stored, measured or simulated reference matrices for different media, and wherein a matrix is generated from at least one of the measured frequencies or amplitudes and is compared to the stored matrices.

8. The method according to claim 1, wherein the control and evaluation unit has a plurality of at least one of stored, measured or simulated reference matrices for different media, further comprising only comparing a matrix generated for determining a medium entering the leakage chamber to the reference matrices stored in the evaluation unit in the case of a leakage.

* * * * *